April 23, 1957 J. C. BUTTRICK 2,789,806
POWER DRIVEN CUTTING MECHANISM HAVING MEANS
FOR MOVABLY MOUNTING CUTTER BITS
Filed May 10, 1956 3 Sheets-Sheet 1

INVENTOR
JAMES C. BUTTRICK

Baldwin & Wight

BY

ATTORNEYS

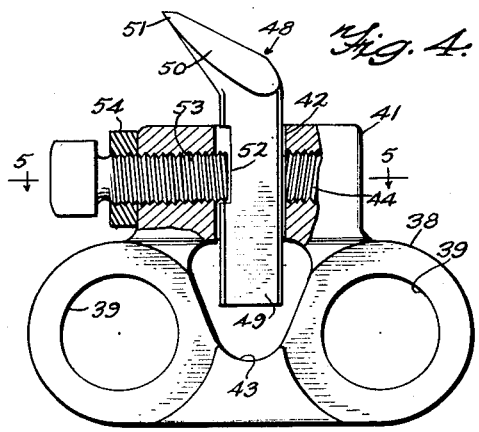
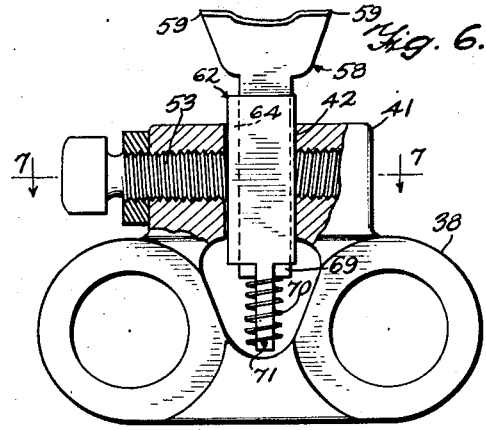
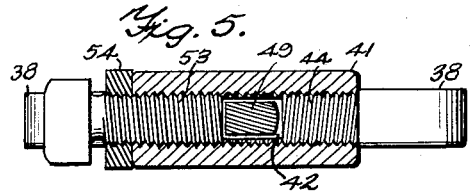
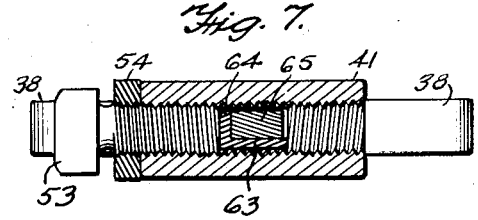
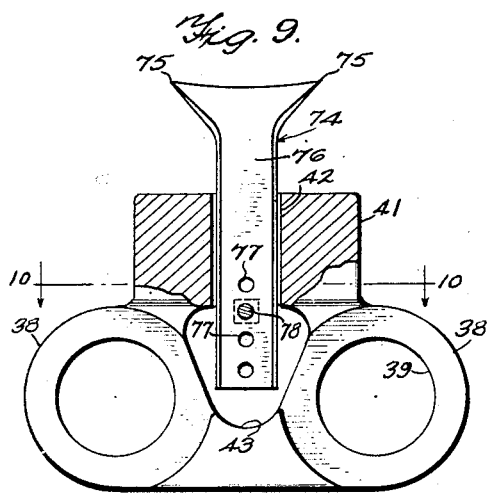
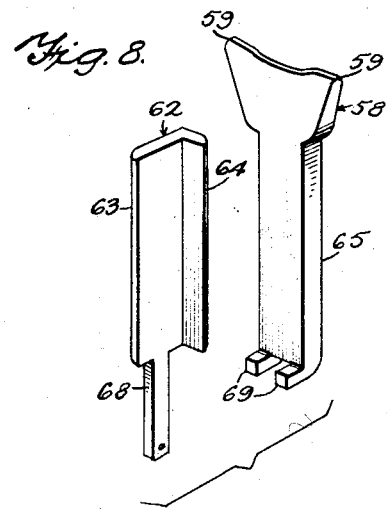
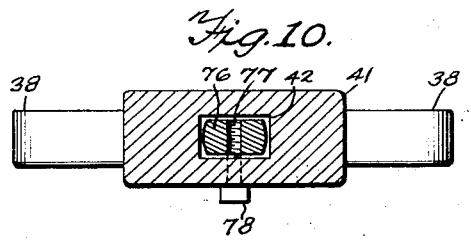
INVENTOR
JAMES C. BUTTRICK April 23, 1957  J. C. BUTTRICK  2,789,806
POWER DRIVEN CUTTING MECHANISM HAVING MEANS
FOR MOVABLY MOUNTING CUTTER BITS
Filed May 10, 1956  3 Sheets-Sheet 3
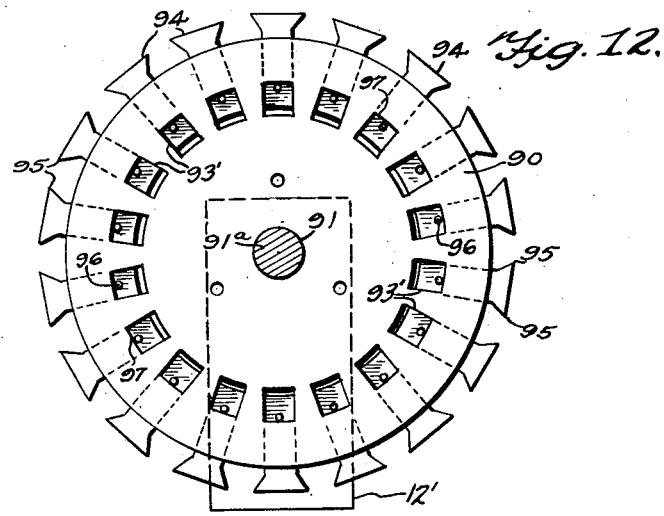
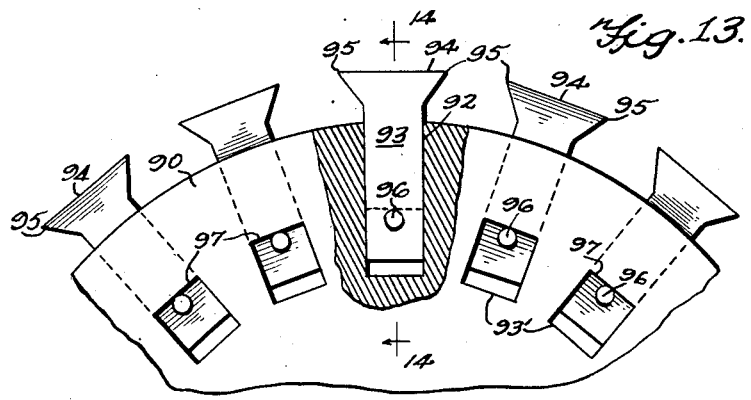
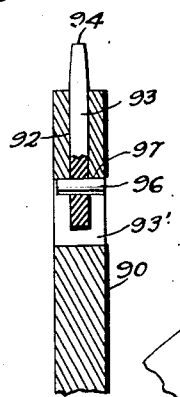
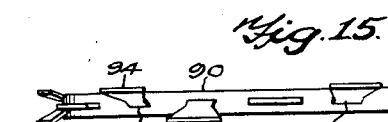
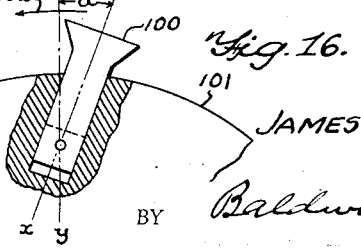
INVENTOR
JAMES C. BUTTRICK
BY Baldwin + Wight
ATTORNEY

United States Patent Office 2,789,806
Patented Apr. 23, 1957

2,789,806

POWER DRIVEN CUTTING MECHANISM HAVING MEANS FOR MOVABLY MOUNTING CUTTER BITS

James C. Buttrick, Garten, W. Va.

Application May 10, 1956, Serial No. 584,139

15 Claims. (Cl. 262—33)

This application is a continuation-in-part of my copending application Serial No. 257,607 filed November 21, 1951, now abandoned.

This invention relates to power driven cutting mechanisms, and has particular reference to such mechanisms especially intended for use in the cutting of hard material, as in the mining of coal.

It is the common practice in a number of fields to provide assemblies of cutting elements, driven by endless chains or rotary members which form tool holders for supporting cutting elements for cutting the desired materials. Apparatus of this character is in common use, for example, in the mining of coal, and it is well known that the cutting elements or bits used in such work are subjected to substantial wear and destructive forces through which the life of each cutting bit is limited.

The destruction of cutting bits in chain driven and rotary cutting mechanisms of the type referred to has obvious serious disadvantages. In the first place, the frequent replacement of the cutting elements involves substantial expense. In the second place, substantial time is required for replacing, inverting or otherwise substituting new cutting edges for those which have been unduly worn. Numerous efforts have been made to reduce to a minimum the disadvantages involved in such substitution of new cutting elements for worn elements, but these efforts have been directed more to simplifying and reducing the time involved in the changing of the cutting elements than to reducing the excessive wear normally caused in the use of such mechanisms. It is believed that prior to the present invention, all of the causes of excessive wear have not been properly diagnosed, and accordingly the problems involved have been solved only to a limited extent.

I have found that in the use of mechanisms of the character referred to, and particularly in coal mining apparatus, the "cutter bars," after being "sumped" into position, are moved laterally of such cutter bars. These cutter bars support the chains carrying the cutting elements, and these cutting elements or bits, moving along the side of the cutter bar at which the cutting operation is taking place, travel parallel to the adjacent run of the chain, thus providing one direction of movement of each successive bit as it engages the vein of coal. The lateral movement of the cutter bar at the same time introduces a second component of movement laterally of the operating run of the chain, that is, the run carrying the bits which are performing the cutting operation. These components of movement, taken together, produce a movement of each successive cutter bit at a slight angle to and divergent from the operating run of the chain. Therefore, each cutting element is forced to perform its cutting operation while being fed laterally of the cutter bar against the vein of coal, thus producing a very appreciable degree of friction against each bit immediately behind the cutting edge thereof. This friction occurs incident to the performance of no useful work and involves, in itself, two very substantial disadvantages. In the first place, it materially increases the power necessary to move the chain of the cutter bar. In the second place, it increases to a material degree the generation of destructive heat which causes the cutting points of the bits to lose their temper and thus lose their cutting efficiency.

An important object of the present invention is to provide a chain driven or rotary cutting mechanism of the type referred to wherein, through very minor changes, the very substantial and useless friction generated back of the cutting point of each bit is eliminated, thus substantially reducing the power necessary for operating the apparatus and also materially reducing the generation of destructive heat.

A further object is to provide a novel mounting of a cutting bit in an apparatus of this character wherein each cutting bit moves during the cutting operation in a line parallel to the operating run of the chain, or transversely to the direction of advancing movement of the rotary member, instead of being moved laterally with the cutter bar in the direction of advancing movement of the latter or the rotary member, thus providing a structure wherein each bit merely performs its intended operation of cutting without being forced under pressure against the material being cut, the component of movement of the bit laterally of and with the cutter bar or radially with the rotary member being substantially eliminated.

A further object is to provide an apparatus of the character referred to wherein each cutting bit is so constructed as to maintain its cutting engagement with the material being cut without being held under pressure against the material by the operating run of the chain or by the feeding movement of the rotary member, the bit and its supporting means being relatively movable whereby the supporting means is laterally movable with the cutter bar or rotary member in the advancing operation of the latter without transmitting similar movement to the bit.

Other objects and advantages of the invention will become apparent during the course of the following description.

In the drawings, I have shown several embodiments of the invention. In this showing, Figure 1 is a horizontal sectional view diagrammatically representing the initial and "sumped" positions of a cutting apparatus of the chain driven type, shown in the present instance as a mining apparatus, Figure 2 is a diagrammatic plan view of a cutter bar of more or less conventional type illustrating the resultant direction of movement of one cutting bit incident to the driving of the bit by the chain and the bodily movement of the cutter bar laterally thereof, Figure 3 is a similar view illustrating the same operations as applied to the present invention, Figure 4 is a side elevation of a chain lug and bit constructed in accordance with the present invention, parts being broken away, Figure 5 is a sectional view on line 5—5 of Figure 4, Figure 6 is a view similar to Figure 4 showing a modified form of the invention, Figure 7 is a sectional view taken on line 7—7 of Figure 6, Figure 8 is a detailed perspective view of the cutting element and guide means therefor corresponding to the form of the invention shown in Figures 6 and 7, the parts being shown separated.

Figure 9 is a view similar to Figure 4 showing a further modified form of the invention, Figure 10 is a sectional view on line 10—10 of Figure 9, Figure 11 is a sectional view taken generally on the line 11—11 of Figure 3, showing the invention as applied to a multi-point cutting apparatus, Figure 12 is a face view of a modified form of cutting head of circular rotatable form, a shaft being shown in transverse section, Figure 13 is an enlarged fragmentary face view of the same, a portion of the wheel being shown in section, Figure 14 is a detail sectional view on line 14—14 of Figure 13, Figure 15 is an edge elevation of the same; and Figure 16 is a schematic, fragmentary elevational view showing a modified mounting of a cutting bit, applicable either to constructions as shown in Figures 1 to 11, or constructions as shown in Figures 12 to 15.

Referring to Figure 1, the numeral 10 designates a vein of coal in a mine, and a mining apparatus is shown in initial and operating positions relative to the vein of coal. Such mining apparatus is indicated as a whole by the numeral 11, the apparatus embodying the usual carriage and power source 12 and a cutter bar indicated as a whole by the numeral 13. The carriage 12 is provided with the usual line 14 passing around a sheave 15 and adapted to be wound up on a drum 16 at one end of the cable, the opposite ends of the cable being connected to a fixed stake 17 commonly referred to as a "jack." A second cable 18 has one end passing around a sheave 19 and adapted to be wound on a drum 20, and the other end of the cable 18 is connected to a "jack" 21. The mining apparatus is initially brought up to the position shown in dotted lines in Figure 1 and the cables 14 and 18 are connected to the jacks 17 and 21. The drum 16 is then driven to swing the apparatus to perform the "sumping" operation which consists in moving the cutter bar 13 into the vein of coal, whereupon the apparatus assumes the solid line position shown in Figure 1. The cable 18 is slowly wound upon the drum 20 to move the apparatus as a whole, in this instance to the left in Figure 1, to cut through the vein of coal in accordance with conventional practice, the cable 14 being manipulated to maintain the proper relative position of the cutter bar.

In accordance with conventional practice, the cutter bar comprises supporting structural elements 25, supporting shafts 26 and 27 carrying conventional sprockets (not shown) about which passes a chain 28, alternate links 29 of which carry lugs 30 in which are fixed cutting bits 31. Assuming the apparatus to be moving to the left in Figure 1, the chain 28 will be driven in the direction indicated by the arrow 32 in Figure 2, the left side of the chain 28 in Figure 2 being the operating run of the chain since the cutting operation is performed by the bits 31 operated by such run of the chain. At the same time, the cutter bar will be moved progressively in the direction indicated by the arrow 33 in Figure 2.

Under the conditions referred to, the single bit 31 shown in Figure 2 will be driven by and movable bodily with the operating run of the chain and will move from the solid line position in Figure 2 to the dotted line position during the performance of its cutting operation, the cutting point of the bit traveling in a line 35 which is angled with respect to the operating run of the chain as shown to an exaggerated extent in Figure 2 for the purpose of illustration. Only a single bit 31 is shown in Figure 2 to more clearly illustrate the operation referred to. It will be apparent that as the bit moves downwardly as viewed in Figure 2 to perform its cutting operation, it is moved slowly to the left under the pressure of the movement of the cutter bar 13 as the bar is moved in the direction of the arrow 33. However, it is only the component of movement of the bit 31 parallel to the operating run of the chain which performs the cutting operation, generally speaking, and the lateral movement of the bit causes the latter to be maintained under useless heavy pressure against the vein of coal, thus multiplying the power necessary to operate the apparatus, and generating substantial destructive heat.

The corresponding operation of the present apparatus is shown in Figure 3 and will be more clearly understood after a consideration of the structural features of the present invention.

In Figure 4, there is shown one of the bit carrying links of the chain, such link being indicated by the numeral 38 and being provided in opposite ends with openings 39 for the connecting pins 40 (Figure 3) of the links of the chain. The bit carrying link 38 is provided outwardly of the cutter bar with a lug 41 having an opening 42 extending therethrough laterally of the adjacent run of the chain. A space 43 is provided inwardly of the lug 41. The lug 41 is preferably drilled and tapped longitudinally of the run of the chain as at 44 for a purpose to be described.

One type of cutting bit has been illustrated in Figure 4 and has been designated as a whole by the numeral 48. This bit comprises a flat shank 49 having clearance therearound with the opening 42 so as to be laterally movable with respect to the adjacent run of the chain. The bit further comprises a cutter head 50 having a cutter point 51 at the end thereof, the cutting head being inclined in the direction of movement of the chain in performing the cutting operation, as will be apparent.

The bit shank 49 is provided in one edge thereof with a notch 52 in which is arranged the inner end of a cap screw 53 threaded in one end of the opening 44. The latter opening preferably extends through the opening 42 so that the cap screw can be inserted in either end, and the bit can be turned in either direction, depending upon the direction of movement of the chain in the cutting operation. The cap screw is provided with a jam nut 54 to fix it in position, and it will be apparent that the cap screw is not in any sense a set screw since it does not engage the bit shank 49 to fix the latter in position, this shank being slidable in the opening 42.

In Figures 6, 7 and 8, a modified form of the invention is shown in which the same chain link and lug 41 may be used, and these parts have been indicated by the same reference numerals as in Figures 4 and 5. In this modified form of the invention, a double-ended bit 58 has been illustrated, this bit having two cutting edges 59 so that the bit can operate in either direction or can be reversed. In this case, the screw 53 fixes in position a guiding and controlling member indicated as a whole by the numeral 62. This member is of angular cross section as shown in Figures 7 and 8, being provided with a relatively wide flange 63 and a relatively narrow flange 64. The bit 58 is provided with a shank 65, one edge of which lies against the inner face of the flange 64 and the other edge of which terminates slightly short of the free edge of the flange 63 as shown in Figure 7. Thus the screw 53 may fix the member 62 in position without binding the shank 65, the shank being movable laterally of the adjacent run of the chain as in the case of the shank 49. In the modification of the invention, however, a structure is shown by means of which a light spring might be utilized, if desired, to urge the bit relatively outwardly with respect to the chain. The member 62 is provided with an inwardly extending shank 68 straddled by transversely extending fingers 69 formed on the inner end of the shank 65. A spring 70 surrounds the shank 68. This spring has one end engaging the fingers 69 and its other end engaging a pin 71 carried by the shank 68.

A further slight modification of the invention is shown in Figure 9, the chain link and its lug again corresponding to the form previously described and having the parts thereof indicated by the same reference numerals. In this case, a double-ended bit 74 of a slightly different type is illustrated, having two cutting edges 75 and a shank 76 slidable in the lug opening 42 in the same manner as the shank 49 in the form of the invention shown in Figure 4. In the form of the invention shown in Figure 4, the screw 53 limits sliding movement of the bit shank. In Figure 9, the shank 76 is provided with a plurality of transverse threaded openings 77 for selectively receiving a screw 78 engageable with the bottom of the lug 41 to limit outward movement of the cutting bit. Inward movement of the bit is limited by engagement of the bottom of the shank 76 with the bottom of the opening 43.

It is the common practice in apparatus of this character to provide what is known generally as "multipoint" cutters. In Figure 11, there is generally shown a three-point cutter, and all of these points or bits may be constructed in accordance with the present invention. In practice, it has been found that substantially improved results can be obtained if only one cutter of each set is constructed in accordance with the present invention. For example, in Figure 11, there is shown a cutter 80 which is in the plane of the chain, and angular cutters 81 cooperating with the cutter 80 to cut wider kerfs in the vein of coal. As previously stated, all of these points are preferably constructed in accordance with the present invention to secure improved results to the maximum extent, but results which are definite improvements over prior constructions may be obtained by constructing the center cutter 80 in accordance with the present invention while employing conventional cutters 81. The reason for this is that the breaking away of the material by the center cutter 80 in its cutting operation renders the friction at the ends of the cutters 81 less serious since the material is more readily broken by the outer cutters with the center cutter 80 acting as a pilot cutter.

In Figure 3 of the drawings, there has been generally represented the operation which occurs with the present invention, only a single cutter being illustrated and this being somewhat exaggerated as to length in the solid line representation of the cutter at the top of Figure 3. Here again the operating run of the chain moves with respect to the cutter bar in the direction indicated by the arrow 84 while the cutter bar is bodily advanced, in this case toward the left as indicated by the arrow 85. With a properly constructed cutting angle on the cutter bit, this bit feeds itself sufficiently into the coal or other material and may move in a line indicated by the numeral 86 which will be parallel to the operating run of the chain instead of angularly as indicated by the numeral 35 in Figure 2. The reason for this is that the mounting of the cutter in accordance with any form of the invention is such that the cutter bar may move laterally without imparting force in such direction against the cutting bits due to the sliding movement of the latter relative to the supporting lugs 41.

In Figures 12-15 inclusive I have shown a modified form of the invention embodied in a cutter head of the rotary type similar to a circular saw. In such modified form of the invention, the numeral 90 designates a rotary member or wheel having a shaft-receiving opening 91 in the center for connecting a drive shaft 91ª to the wheel. The shaft 91ª may be mounted for advancing movement substantially radially with respect to the wheel 90 in any suitable manner, for example being mounted similarly to the shaft 27 shown in Figure 1, i. e. the shaft 91ª may be journalled on a carrier 12' similar to the carriage 12 shown in Figure 1. The wheel 90 is provided with means for supporting a set of cutting tools, such means comprising a plurality of circumferentially spaced radial openings 92 communicating at their radially inner ends with transverse openings 93' extending through the wheel 90. Each of the openings 92 is adapted to receive the shank 93 of a cutting tool 94 having opposite generally tangentially extending cutting edges 95. The cutting tool in this case is closely similar to the cutting tool in Figure 9 and, if desired, the radially outer edge of each tool may be flat, as shown in Figure 13.

The shanks 93 and their openings 92 are preferably substantially rectangular in cross section to prevent the turning of the tool shanks after the fashion of the structure shown in Figure 10, and the tool shanks are freely substantially radially slidable in the openings 92. Each tool shank is provided within the associated openings 93' with a stop pin 96 engageable with the radially outer extremity 97 of the associated opening 93' to limit radially outward movement of each cutting tool. The pins 96 may be secured in position in any manner, for example by being threaded as is the pin 78 in Figure 9, or they may be slightly tapered to provide a driving fit in the shanks of the tools. In either case, the ends of the pins 96 preferably do not project beyond opposite faces of the wheel 90 so as to avoid interference with the cutting action.

It will be apparent that all of the cutting tools in Figures 12-15, inclusive, have been illustrated at their radially outer limits of movement, and the tools are movable radially inwardly relatively to the wheel 90 to the extent defined between the inner ends of the tool shanks and the radially inner extremities of the openings 93'. Referring to Figure 15, it will be noted that the cutting edges of the tools are differently inclined with respect to the plane of the wheel 90 so as to insure the cutting of a groove wider than the wheel 90 without any binding of the wheel in the cut or sawed groove.

*Operation*

The operation of the invention will be clear from the foregoing description. Referring, firstly, to the operation of the constructions shown in Figures 1 to 11, the normal starting positions of the cutting bits will be as shown, for example in Figure 4, with the screw 53 engaging the inner end of the slot 52. This position will be assumed automatically by centrifugal force as each bit passes in an arcuate path around the shaft 27, and once the bit engages the material being cut, it tends to hold itself in the material to perform the cutting operation. As the bit starts its cutting operation, it will assume the position shown in solid lines in Figure 3, being pulled relatively outwardly with respect to the lug 41 as shown in the solid line position in Figure 3 corresponding to the position of the bit in Figure 4. The operating run of the chain will transmit force to the bit to move in the direction of the arrow 84 and line 86. As the cutter bar moves laterally, however, this component of movement is not positively imparted to the bit and the latter accordingly moves as indicated by the line 86 while the lug 41 will partake of angular movement as indicated by the line 87 in Figure 3. Thus the lateral movement of the cutter bar does not positively impart any movement to the bit itself laterally of the cutter bar, although such lateral movement obviously is imparted to each lug 41 as the latter moves generally in the direction indicated by the arrow 84 in Figure 3. Lateral movement of the bit to the left of the cutting bar in Figure 3 is opposed by pressure of the bit against the material being cut, and this tends to cause the shank of the bit to slide relatively to the associated lug 41. Each bit has its cutting edge at the extremity of the bit remote from the associated lug, and such cutting edge projects in the direction of movement of the adjacent run of the chain and is angularly undercut. This angular undercutting, as the bit is driven by its lug, tends to cause the bit to feed laterally of the cutter head away from its associated lug into the material being cut. At the same time, such movement of the bit into the material is opposed by pressure on the point of the bit remote from the lug against the material being cut. Thus there are two forces acting on the bit laterally of the lug, namely, the force caused by the undercutting of the bit tending to cause it to move into the material, and the pressure of the material against the outer extremity of the bit, which tends to prevent the bit from digging more deeply into the material. Accordingly, it has been found in actual practice that when a bit reaches the straight run of the chain at the beginning of the cutting operation, it will move substantially in the straight line indicated by the numeral 86 in Figure 3, this line being at a slight angle to the line 87 which indicates the path which will be taken by each successive lug 41 as the cutter head is advanced toward the left.

It will be apparent that in the absence of the mounting of each bit shank for sliding movement in the associated lug 4, that is, if each bit shank were fixed with respect to its associated lug as in conventional constructions, each cutting point would be forced to move laterally of the cutter head, that is, to the left in Figure 3. Under such conditions, the line of cut would be parallel to the angular line 87 in Figure 3. It is this lateral component of movement of the bit in prior constructions which causes extreme wear to take place outwardly of the point of the bit, thus requiring frequent renewals and resharpening of the bits. The very great additional friction thus caused, moreover, requires greater power for the operation of the bit than is true of the present construction, as further explained below.

Of course, the cutting action in the direction of the arrow 84 in Figure 3 causes an opposite reaction against the cutting bit, thus tending to swing the bit shank in its opening 42, and this necessarily causes some gripping action between the walls of the opening 42 and the bit shank. This gripping action prevents completely free relative sliding movement of the lug 41 and bit shank 49 laterally of the cutter bar, but this is purely incidental and has no effect on the operation described above.

In prior conventional constructions wherein the bits are fixed to their lugs, tests have indicated that the great friction encountered by the bit due to the lateral component of movement of the latter is much greater than the cutting force applied to the bit in its component of movement longitudinally of the cutter bar. It is this pressure against the bit point laterally of the cutter bar which causes the rapid wearing of the bit. With the present construction, tests have indicated that under average operating conditions a force of approximately 60 lbs. is applied to each bit in the direction of cutting longitudinally of the cutter bar. Such tests, however, have indicated that with the present construction the lateral force acting against the bit incident to lateral movement of the cutter bar will amount to only approximately 30 lbs. This pressure under actual operating conditions is due partly to the incidental frictional engagement of the lug with the bit shank and is due principally to the action of the undercut formation of the bit which tends to feed it into the material. The approximately 30 lbs. pressure against the bit laterally of the cutter bar is a mere fraction of what is present in conventional constructions and, accordingly, the present apparatus not only very greatly minimizes the wearing of the bits, but also reduces the power required for the operation of the apparatus.

Essentially, therefore, the present invention comprises the provision of a support such as a lug 41 having means for moving it in a predetermined path, in combination with a nonrotatable cutting element carried by the support and slidable relative thereto substantially perpendicular to the path of movement of the support. With such an arrangement, the lug provides positive means for moving the bit with a primary component of movement corresponding to the path of travel of the lug, but wherein there is no positive connection between the lug and the bit to force the latter to follow a component of movement of the lug laterally of the path of movement referred to. By providing such cutting element with a cutting edge at the extremity thereof remote from the lug, with the cutting edge extending in the direction of movement of the cutting element and angularly undercut, movement of the support in its path causes the cutting element to tend to feed laterally of such path outwardly away from the lug into the body of material being cut. It is this general arrangement of parts which provides the very important advantages of the present construction. Accordingly, there is a saving of power and a substantial reduction in the generation of destructive heat on each bit point. Therefore, the present invention operates not only to reduce the power required for the cutting operation, but minimizes the necessity for the changing of bits as frequently as is now required.

It also will be apparent that when the bit is worn, assuming that the type of bit shown in Figure 4 is being used, it merely is necessary to loosen the nut 54, back the screw 53 outwardly only a fraction of an inch, and then remove and replace the bit. The screw 53 then may be turned inwardly to the slight extent necessary to limit sliding movement of the shank, but never to bind this shank. The nut 54 is then tightened. Thus it is necessary only infrequently to change the bits, and when this is necessary, the operation may be very quickly and easily performed.

The operation of the form of the invention shown in Figure 6 is substantially identical with that described above except that a light spring 70 is employed to urge the bit relatively outwardly to assure the arrangement of the bit in the proper initial cutting position. However, the lug 41 is free to move outwardly on the bit shank incident to the slight angular movement of each lug 41 incident to the advancing of the cutter bar laterally thereof. A double-ended bit is shown in Figure 6, and when one cutting edge is worn, the screw 53 may be loosened in the manner described, the whole cutting unit comprising the bit and member 62 and associated elements may be pulled out of the opening 42, and reversed end for end or replaced with another bit.

Attention is invited to the fact that in the double-edged forms of the invention as in Figures 6 and 9, the trailing cutting edge operating in the kerf cut by the leading cutting edge causes the cutting tool to "track," thus preventing any twisting of the cutting edge incident to its relatively loosely fitting in its guide means. Such twisting could result in the binding of the shank of the cutter, and the double-edged cutting element prevents such result, leaving the cutting element free to partake of its intended movement relative to the chain, as described.

The present invention makes it practicable to use a double-edged cutting element. Inasmuch as pressure and friction outwardly of the operating cutting edge are relieved as bodily movement of the cutter bar takes place, it necessarily follows that such pressure and friction are also relieved adjacent the trailing cutting edge and between the cutting edges. In prior constructions, this pressure and friction is present adjacent and between both cutting edges in a double-edged cutting implement. The use of such cutting implements is desirable for guiding the cutting implement to cause it to "track," as stated above, and is further advantageous, particularly in the present construction, since the cutting implement may be easily and quickly reversed when desired. Additionally, the use of a cutting implement of this type is advantageous because of the additional metal used in the head of the cutting implement. This greatly increases the strength of each individual cutting implement and provides more metal to carry away heat, thus additionally lengthening the life of the cutting element. As stated, the use of such an element is far more practicable with the present invention than in prior constructions because of the elimination of the useless friction outwardly of the cutting head.

The form of the invention shown in Figure 9 operates in the same manner as the form shown in Figure 4 except that the bit may be reversed, and outward movement of the bit is limited by the transverse screw 78 instead of by the screw 53. If the bit is worn, the screw 78 may be moved to successive inner openings 77 to allow the cutting edges to move outwardly from the chain the desired distance.

Except for the fact that the cutting tools shown in

Figures 12–15 are carried by a rotary member, the operation of the form of the invention shown in these figures will be identical to the operation of the forms previously described. Rotation of the wheel member 90 will move each cutting tool, prior to its entrance into the material being cut, substantially radially outwardly to its limit of movement. As the wheel is moved substantially radially relatively to the material to be cut for the progression of the cutting operation, each cutting edge 95 travels in an arcuate line which is concentric with the axis of rotation of the wheel as each cutting tool enters the material being cut at the point of contact.

If rotation of the wheel 90 were to continue about a fixed axis, each tool cutting edge would travel arcuately in a path at all points equidistant from the periphery of the wheel. Since, however, the wheel is advanced or moved bodily in a radial direction, its axis of rotation moves; but this does not cause the tools also to have the same radial advancing movement. Instead, the shank of each tool moves substantially radially inwardly relatively to, i. e. not radially together with, the wheel 90. Consequently, the tools are free to cut without the exertion of the same pressure against the outer edges of the tools as would be exerted if the tools were forced to partake of the same radial bodily advancing movement as the wheel. As each successive tool passes out of engagement with the material being cut, centrifugal force will move it to its radially outer limit of movement for its next engagement with the material being cut.

From the foregoing, it will be apparent that the present invention reduces the power required for the operation of the device while at the same time materially reducing the destructive forces to which bits of this character are commonly subjected. It also will be apparent that the invention is highly simple in nature and economical to produce, and that the replacement or reversing of the bits may be accomplished in less time than is required with conventional constructions.

While the invention has been particularly described with relation to a chain-driven or rotary cutting mechanism, and, by way of example, with relation to a mining apparatus, it is to be understood that the invention is not limited to any particular type of power driven cutting apparatus so long as the apparatus is of the type which is bodily movable relatively into the material being cut, and is capable of carrying cutting elements mounted for relative movement with respect to the apparatus by which they are carried.

In each form of the invention illustrated the bit is under-cut at an angle inwardly of its cutting edge, and such edge extends in the direction of movement of the element which carries the bit. This under-cut angularity tends to hold the cutting edge of each bit in the material as movement is imparted to the bit. A highly efficient cutting action is performed, therefore, with a minimum exertion of pressure laterally of the chain or other bit-carrying structure, thus reducing the power necessary for operating the apparatus and materially reducing wear on the bits. In each form of the apparatus shown in Figures 1 to 11, after the lateral movement of the cutter bar is started, the bits operating in the return run of the chain or other driving unit are free to slide relatively to the opening in which their shanks are arranged. Therefore, as each bit reaches the end of the straight return run of the chain, that is, the right-hand side as viewed in Figures 1 and 3, it requires very little centrifugal force to cause the bits to move to their outermost limits as shown in Figure 4. This action readily is accomplished within the 90° of turning movement of each bit beyond the end of the return run of the chain before each bit engages the material to be cut. At the point of engagement of each bit with the material, the under-cut end of the bit causes the cutting edge immediately to engage in the material, thus holding the bit at its outer limit of movement until the bit is caused to start to move inwardly relative to its supporting lug, as explained above.

The restoring or extending action of the bits 94 shown in Figures 12 to 15 is similar to that described above with reference to Figures 1 to 11. After each bit 94 has passed out of the material being cut, and while travelling along a generally arcuate path, centrifugal force causes it to be moved outwardly to the limit position determined by engagement of the pin 96 with the outer extremity of the associated opening 93'.

While in the forms shown in Figs. 1–11, inclusive, the cutting bits have been illustrated as being movable perpendicularly relatively to the path of travel of the associated bit supports, even better results may be obtained with the bits being mounted to move relatively to their supports along lines extending at small angles to the path of travel of the supports, it being sufficient that the bits be movable substantially or generally perpendicularly to the path of movement of the supports. Similarly with respect to the embodiment shown in Figs. 12–15, inclusive, the cutting bits need not be slidable relatively to the wheel along lines strictly radially with respect to the wheel, some angularity to the radial line being permissible and in some cases, desirable. Even improved results may be obtained, especially when cutting hard materials, by so mounting the bits that they extend at small angles to the perpendicular or radial lines, with the bit shank axes being inclined outwardly from the supports and rearwardly with respect to the cutting travel of the bits. Figure 16 schematically shows a construction in which a cutter bit 100 is mounted in a circular or wheel support 101 in such a manner as to be slidable relatively to the support along a line $x$—$x$ at an angle $a$ to a radius $y$—$y$ of the wheel 101, the bit shank axis being inclined outwardly from the wheel periphery and rearwardly with respect to the direction of cutting travel as indicated by the arrow 102. Generally stated, the angle $a$ preferably is larger for cutting relatively hard materials than for cutting relatively soft materials, and may be up to about 20°. Similar considerations apply with respect to the angularity of bits carried by a chain in constructions of the kind shown in Figs. 1–11.

While example forms of the invention are shown and described herein, it is to be understood that other modifications in the specific structure of the invention can be made without departing from the spirit and scope of the invention as defined in the appended claims.

I claim:

1. In a power driven cutting mechanism, a cutting element support, means for moving said support in a predetermined path, a nonrotatable cutting element carried by said support and slidable relative thereto substantially perpendicular to said path, said cutting element having a cutting edge at the extremity thereof remote from said support, said cutting edge extending in the direction of movement of the cutting element and being angularly undercut whereby movement of said support in said path causes said cutting element to tend to feed laterally of said path outwardly from said support into the body of material being cut, and means for limiting sliding movement of said cutting element relative to said support.

2. In a power driven cutting mechanism, a cutting element support, means for moving said support in a predetermined path, said support having a noncircular opening substantially perpendicular to said path, and a cutting element having a shank corresponding in shape to and slidable longitudinally in said opening, said cutting element having a cutting edge at the extremity thereof outwardly of said support, said cutting edge extending in the direction of movement of the cutting element and being angularly undercut whereby movement of said support in said path causes said cutting element to tend to feed laterally of said path outwardly from said support into the material being cut, said cutting element and said support having interengaging portions limiting sliding movement of said cutting element relative to said support.

3. In a cutting apparatus of the chain type wherein the chain travels in a given path, a cutting element support connected to the chain and movable therewith in said path, a nonrotatable cutting element carried by said support and slidable relative thereto substantially perpendicular to said path, said cutting element having a cutting edge at the extremity thereof outwardly of said support, said cutting edge extending in the direction of movement of the cutting element and being angularly undercut whereby movement of said support in said path causes said cutting element to tend to feed laterally of said path outwardly from said support into the body of material being cut, and means for limiting sliding movement of said cutting element relative to said support.

4. In a cutting apparatus of the chain type wherein the chain travels in a given path and comprises a plurality of links, one of said links constituting a cutting element support having a non-circular opening therethrough extending perpendicular to said path, and a cutting element having a shank corresponding in cross sectional shape to said opening and slidable therein, said cutting element having a cutting edge at the extremity thereof outwardly of said support, said cutting edge extending in the direction of movement of the cutting element and being angularly undercut whereby movement of said support in said path causes said cutting element to tend to feed laterally of said path outwardly of said support into the body of material being cut, said support and said cutting element shank having interengageable portions limiting sliding movement of said cutting element relative to said support.

5. In a cutting apparatus of the chain type wherein a link chain is adapted to be supported by sprockets for movement in a given path and wherein said chain has an operating run movable in one direction between such sprockets, one link of said chain comprising a lug having an opening therethrough perpendicular to said run of the chain when said lug is in said run, a cutting element having a shank nonrotatably slidable in said opening and projecting therefrom outwardly of said lug, said shank terminating at its outer end in a cutting head having a cutting edge extending in said direction from said shank, said edge being angularly undercut whereby movement of said lug in said run of the chain causes said cutting element to tend to feed laterally of said run outwardly from said lug into the body of material being cut, and means interengageable between said lug and said shank for limiting sliding movement of the latter relative to said lug.

6. In a power driven cutting mechanism, a cutting element support, means for moving said support in a predetermined path, a nonrotatable cutting element having a shank carried by said support and slidable relative thereto substantially perpendicular to said path, said cutting element having a cutting edge at the extremity thereof outwardly of said support, said cutting edge extending in the direction of movement of the cutting element and being angularly undercut whereby movement of said support in said path causes said cutting element to tend to feed laterally of said path outwardly from said support into the body of material being cut, said shank having a cut-away portion, and an element carried by said support and projecting into said cut-away portion free of binding engagement with said shank to engage the ends of said cut-away portion and limit sliding movement of said shank relative to said support.

7. In a cutting apparatus of the chain type wherein a link chain is supported for travel in a given path, a lug constituting one link of the chain and provided with a noncircular opening therethrough perpendicular to said path, a cutting element having a shank corresponding in cross sectional shape to said opening and slidable therein, said cutting element having a cutting edge at the extremity thereof outwardly of said lug, said cutting edge extending in the direction of movement of the cutting element and being angularly undercut whereby movement of said lug in said path causes said cutting element to tend to feed laterally of said path outwardly from said lug into the body of material being cut, said shank having an elongated notch in one side thereof, and a stop element carried by said lug and projecting into said notch free of binding engagement with said cutting element and engageable with the ends of said notch to limit sliding movement of said shank relative to said lug.

8. In a cutting apparatus of the chain type wherein a link chain is supported for travel in a given path, a lug constituting one link of the chain and provided with a noncircular opening therethrough perpendicular to said path, a cutting element having a shank corresponding in cross sectional shape to said opening and slidable therein, said cutting element having a cutting edge at the extremity thereof outwardly of said lug, said cutting edge extending in the direction of movement of the cutting element and being angularly undercut whereby movement of said lug in said path causes said cutting element to tend to feed laterally of said path outwardly from said lug into the body of material being cut, and a stop member carried by said cutting element and engageable with said lug to limit sliding movement of said cutting element outwardly from said lug.

9. In a power driven cutting mechanism, a cutting element support, means for moving said support in a predetermined path, said support having an opening therethrough perpendicular to said path, a guide mounted in said opening and fixed to said support and defining a guide opening perpendicular to said path, a cutting element having an elongated shank slidable in said guide opening, said cutting element having a cutting edge at the extremity thereof outwardly of said support, said cutting edge extending in the direction of movement of the cutting element and being angularly undercut whereby movement of said support in said path causes said cutting element to tend to feed laterally of said path outwardly of said support into the body of material being cut, and means interengaging between said shank and said guide for limiting sliding movement of said cutting element laterally of said path toward the material being cut.

10. In a power driven cutting mechanism, a cutting element support, means for moving said support in a predetermined path, said support having an opening therethrough perpendicular to said path, a cutting element having a shank nonrotatably slidable in said opening and projecting inwardly and outwardly therebeyond, said cutting element having a cutting edge at the extremity thereof outwardly of said support, said cutting edge extending in the direction of movement of the cutting element and being angularly undercut whereby movement of said support in said path causes said cutting element to tend to move laterally of said path outwardly of said support into the body of the material being cut, and a stop member carried by said shank beyond the inner end of said opening and engageable with said lug to limit outward movement of said cutting element.

11. In a power driven cutting mechanism, a rotatable member providing a cutting element support, means mounting said member for rotation about its axis in a predetermined path and for advancing movement in a radial direction, a cutting element carried by said member at its periphery and being nonrotatable relatively to said member but being slidable substantially radially relatively thereto, said cutting element having a cutting edge at the extremity thereof remote from said member and extending in the direction of movement of the cutting element in said path and being angularly undercut, whereby movement of said member and said cutting element in said path causes said cutting element to tend to feed laterally of said path radially outwardly from said member into the body of material being cut, and means for limiting radial sliding movement of said cutting element relative to said support.

12. In a power driven cutting mechanism, a rotatable member providing a cutting element support, means mounting said member for rotation about its axis in a predetermined path and for advancing movement in a radial direction, said member having an opening extending radially inwardly from its periphery and being noncircular in cross section, a cutting element having a shank corresponding in cross section to and being slidable substantially radially in said opening, said cutting element having a cutting edge at the extremity thereof remote from said member and extending in the direction of movement of the cutting element in said path and being angularly undercut, whereby movement of said member and said cutting element in said path causes said cutting element to tend to feed laterally of said path radially outwardly from said member into the body of material being cut, and means for limiting radial sliding movement of said cutting element in said opening relative to said support.

13. In a power driven cutting mechanism, a wheel member, means mounting said wheel member for rotation about its axis and for relative radial movement with reference to material to be cut, a plurality of circumferentially spaced cutting elements carried by said member at its periphery, each of said cutting elements being nonrotatable relatively to said member but being slidable substantially radially relatively thereto and each said cutting element having a generally tangentially extending cutting edge at its extremity remote from said member, each said cutting edge being angularly undercut whereby rotation of said cutting element circumferentially about the axis of rotation of said member causes said cutting element to tend to feed radially outwardly from said member into the material being cut, and means associated with each cutting element for limiting radial sliding movement thereof relative to said member.

14. In a power driven cutting mechanism, a cutting element support, means for moving said support in a predetermined path, a nonrotatable cutting element carried by said support and slidable relative thereto generally transversely to said path, the direction of sliding of said cutting elements being inclined at a small angle outwardly from said support and rearwardly with respect to said path, said cutting element having a cutting edge at the extremity thereof remote from said support, said cutting edge extending in the direction of movement of the cutting element and being angularly undercut whereby movement of said support in said path causes said cutting element to tend to feed laterally of said path outwardly from said support into the body of material being cut, and means for limiting sliding movement of said cutting element relative to said support.

15. In a power driven cutting mechanism, a rotatable member providing a cutting element support, means mounting said member for rotation about its axis in a predetermined path and for advancing movement in a radial direction, a cutting element carried by said member at its periphery and being nonrotatable relatively to said member but being slidable relatively thereto and generally transversely relatively to said path, the direction of sliding of said cutting element being inclined at a small angle outwardly from said member and rearwardly with respect to said path, said cutting element having a cutting edge at the extremity thereof remote from said member and extending in the direction of movement of the cutting element in said path and being angularly undercut, whereby movement of said member and said cutting element in said path causes said cutting element to tend to feed laterally of said path outwardly from said member into the body of material being cut, and means for limiting sliding movement of said cutting element relative to said support.

References Cited in the file of this patent

UNITED STATES PATENTS

| | | |
|---|---|---|
| 640,621 | Bailey | Jan. 2, 1900 |
| 787,551 | Aultman | Apr. 18, 1905 |
| 1,467,571 | Des Rosiers | Sept. 11, 1923 |
| 1,550,669 | Bowman | Aug. 25, 1925 |
| 2,686,663 | Bruestle | Aug. 17, 1954 |